(12) United States Patent
Park et al.

(10) Patent No.: US 8,593,984 B2
(45) Date of Patent: Nov. 26, 2013

(54) APPARATUS AND METHOD FOR MEASURING INDIVIDUAL RECEIVING POWER USING IDENTIFICATION SIGNAL

(75) Inventors: Sung-Ik Park, Daejeon (KR); Heung-Mook Kim, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 274 days.

(21) Appl. No.: 13/120,756

(22) PCT Filed: Apr. 13, 2009

(86) PCT No.: PCT/KR2009/001884
§ 371 (c)(1),
(2), (4) Date: Mar. 24, 2011

(87) PCT Pub. No.: WO2010/050655
PCT Pub. Date: May 6, 2010

(65) Prior Publication Data
US 2011/0170585 A1    Jul. 14, 2011

(30) Foreign Application Priority Data
Oct. 27, 2008 (KR) .................. 10-2008-0105343

(51) Int. Cl.
*G01R 31/08* (2006.01)
*H04J 1/16* (2006.01)
*H04L 1/00* (2006.01)
*H04B 7/185* (2006.01)
*H04B 7/00* (2006.01)

(52) U.S. Cl.
USPC ..................... 370/252; 370/318; 455/522

(58) Field of Classification Search
USPC .................. 370/252, 318; 375/144, 148, 211; 455/13.4, 127.1, 522
See application file for complete search history.

(56) References Cited

U.S. PATENT DOCUMENTS

| 6,975,666 B2* | 12/2005 | Affes et al. | 375/130 |
| 2003/0026360 A1* | 2/2003 | Ramasubramanian et al. | 375/343 |
| 2004/0048593 A1* | 3/2004 | Sano | 455/323 |
| 2004/0139466 A1* | 7/2004 | Sharma et al. | 725/72 |

(Continued)

FOREIGN PATENT DOCUMENTS

| EP | 1 282 241 A1 | 2/2003 |
| EP | 1 628 409 A1 | 2/2006 |

(Continued)

OTHER PUBLICATIONS

Written Opinion for PCT/KR2009/001884 filed on Apr. 13, 2009.

(Continued)

*Primary Examiner* — Ayaz Sheikh
*Assistant Examiner* — Hoang-Chuong Vu

(57) ABSTRACT

Provided is an apparatus and method for measuring an individual receiving power using an identification signal of a repeater or a transmitter. The apparatus and method includes a total receiving power measuring unit for measuring a total receiving power from transmitters; an identification signal analyzing unit for extracting a channel profile signal from the signal transmitted from the predetermined transmitter through a multi-path, wherein the predetermined transmitter transmits a signal having the identification signal; and an individual receiving power calculating unit for calculating an individual receiving power from the transmitter based on the measured total receiving power and the extracted channel profile signal.

6 Claims, 3 Drawing Sheets

(56) References Cited

U.S. PATENT DOCUMENTS

| | | | |
|---|---|---|---|
| 2006/0023772 A1 | 2/2006 | Mudulodu et al. | |
| 2006/0209970 A1* | 9/2006 | Kanterakis | 375/259 |
| 2006/0251024 A1* | 11/2006 | Wang | 370/333 |
| 2006/0256885 A1 | 11/2006 | Song et al. | |
| 2008/0082222 A1* | 4/2008 | Kim et al. | 701/3 |
| 2008/0175140 A1 | 7/2008 | Mudulodu et al. | |
| 2009/0041163 A1* | 2/2009 | Jonsson et al. | 375/340 |
| 2009/0103640 A1* | 4/2009 | Chen et al. | 375/260 |
| 2009/0323791 A1* | 12/2009 | Yee | 375/224 |
| 2010/0020855 A1* | 1/2010 | Ito et al. | 375/148 |
| 2010/0279727 A1* | 11/2010 | Lin | 455/517 |

FOREIGN PATENT DOCUMENTS

| | | |
|---|---|---|
| WO | WO 01/95653 A1 | 12/2001 |
| WO | WO 2004/075577 A1 | 9/2004 |
| WO | WO 2007/015694 A2 | 2/2007 |
| WO | WO 2007/106119 A2 | 9/2007 |
| WO | WO 2008/054073 A1 | 5/2008 |
| WO | WO 2009/031748 A1 | 3/2009 |

OTHER PUBLICATIONS

International Search Report for PCT/KR2009/001884 filed on Apr. 13, 2009.

\* cited by examiner (PRIOR ART)

APPARATUS AND METHOD FOR MEASURING INDIVIDUAL RECEIVING POWER USING IDENTIFICATION SIGNAL

TECHNICAL FIELD

The present invention relates to an apparatus and method for measuring an individual receiving power using an identification signal; and, more particularly, to an apparatus and method for measuring an individual receiving power using an identification signal of a repeater or a transmitter.

BACKGROUND ART

In general, a wireless communication system performs a communication using a wireless signal of a predetermined band between a terminal and a base station. The wireless communication system includes a mobile communication system using a mobile phone, a wireless broadband (Wibro) communication system, a satellite broadcasting system, and a terrestrial broadcasting system. As mentioned above, the wireless communication systems transmit data between a terminal and a base station through a predetermined radio frequency.

However, as a frequency is getting higher, a radio frequency has a characteristic that refraction and diffraction do not occur. A signal transmitted from a base station has a limitation of a signal transmission distance by a used frequency and topographical condition, that is, topography and building. Accordingly, a designer who designs a wireless communication system must install a base station based on a limitation of a signal transmission distance.

Here, there is a problem in that a lot of base stations must be installed in a crowded building district, or in a case that an area covered by one base station is widened. That is, in case that an area covered by one base station is widened, or a lot of transmitters are installed in a small area, a wireless communication service provider has a lot of loss. Accordingly, it is proposed to transmit a signal using a main transmitter and a repeater as a method for reducing the number of transmitters and transmitting data efficiently. There is a method for coupling the main transmitter with the repeater in a wire communication and a wireless communication.

Firstly, in case of using a wire communication between the main transmitter and the repeater, a plurality of wireless repeaters are used in a small area. However, because it is difficult to use the wire communication if the main transmitter is far from the repeater, a distance limitation can be solved by transmitting data from the main transmitter to the repeater using a radio frequency.

It will be described in detail to transmit data between the main transmitter and the repeater using a radio frequency referring to the accompanying drawings.

FIG. 1 is a simplified diagram illustrating a method for transmitting data between a main transmitter and a repeater using a different frequency.

A main transmitter 101 transmits a signal to repeaters 111, 112, 113 and 114 using a frequency A. The repeaters 111, 112, 113 and 114 receive a signal of the frequency A, and re-transmit a signal to an area of the repeaters using different frequencies which are used in each of the repeaters. That is, a first repeater 111 transmits a signal to an area of the first repeater 111 using a frequency B, and a second repeater 112 transmits a signal to an area of the second repeater 112 using a frequency C. A third repeater 113 transmits a signal to an area of the third repeater 113 using a frequency D, and a fourth repeater 114 transmits a signal to an area of the fourth repeater 114 using a frequency E.

Finally, the main transmitter 101 transmits a signal to repeaters 111, 112, 113 and 114 which are neighbored to the main transmitter 101 using a frequency A, and the repeaters 111, 112, 113 and 114 transmit a signal to the area of the repeaters using an allocated frequency. Data can be transmitted without a shadow area by using the transmission method mentioned above. That is, it is possible to remove an area where a signal is unstably received and increase a service area.

However, as shown in FIG. 1, if the main transmitter 101 and repeaters 111, 112, 113 and 114 use different frequencies, they need a wide frequency band. This causes the deterioration of the reuse efficiency of a frequency which is a limited resource. Thus, it is necessary to improve the reuse efficiency of a frequency.

FIG. 2 is a simplified diagram illustrating a method for transmitting data between a main transmitter and repeaters using the same frequency.

As shown in FIG. 2, a main transmitter 201 and repeaters 211, 212, 213 and 214 transmit a signal using the same frequency A. That is, the main transmitter 201 transmits a signal to an area of the main transmitter 201 using the frequency A. The repeaters 211, 212, 213 and 214 receive the signal transmitted from the main transmitter using the frequency. If the repeaters 211, 212, 213 and 214 receive the signal of the frequency A, the repeaters 211, 212, 213 and 214 transmit the received signal using the same frequency A. Accordingly, the repeaters 211, 212, 213 and 214 maximize the reuse efficiency of the frequency by receiving the signal of the frequency A and transmitting the received signal to an area of the repeaters using the frequency A.

However, as shown in FIG. 2, if the main transmitter 201 and the repeaters 211, 212, 213 and 214 transmit a signal using the same frequency, the high isolation of a transmission/reception antenna between the main transmitter 201 and each of the repeaters 211, 212, 213 and 214 is indispensable. To satisfy the high isolation of the transmission/reception antenna, the main transmitter 201 and each of the repeaters 211, 212, 213 and 214 must be exchanged. That is, if the main transmitter 201 and the repeaters 211, 212, 213 and 214 use the same frequency, the utility of a transmission device used in a conventional wireless communication system is lowered, it needs a new facility investment.

FIG. 3 is a simplified diagram illustrating a method for transmitting data by configuring a distributed repeater network using a distributed repeater.

FIG. 3 shows a distributed repeater network using a distributed repeater which combines the method shown in FIG. 1 and the method shown in FIG. 2. In the method shown in FIG. 3, a main transmitter 301 transmits an area of the main transmitter including repeaters 311, 312, 313 and 314 using a frequency A. The repeaters 311, 312, 313 and 314 receive the signal of the frequency A from the main transmitter 301, and transmit a signal to an area of the repeaters 311, 312, 313 and 314 using a different frequency B. Compared with the method shown in FIG. 1, the method shown in FIG. 3 improves a reuse efficiency of a frequency. Moreover, compared with the method shown in FIG. 2, the method shown in FIG. 3 solves the isolation of a frequency.

However, if the repeaters 311, 312, 313 and 314 are neighbored, the interference of signals can occur. In case of FIG. 2, if the repeaters 211, 212, 213 and 214 are neighbored, and each of the repeaters 211, 212, 213 and 214 and the main transmitter 201 are neighbored, the interference of signals can occur.

To solve the interference problem of signals between the main transmitter and each of the repeaters, or between the repeaters, it is proposed to allocate an identification signal having an excellent correlation characteristic to each of the repeaters and/or the main transmitter, add and transmit the allocated identification signal to a transmission signal and a repeating signal.

In general, a sequence used as an identification signal is embedded as a spread spectrum shape to minimize an influence of a conventional service signal. Accordingly, the identification signal needs a high bit resolution to identify transmitters and/or each of repeaters. Moreover, a long sequence is used for an excellent correlation characteristic. For example, in a USA type digital broadcasting, that is, Advanced Television Systems committee (ATSC) system, a Kasami sequence of 64,896 length is used as an identification signal. The identification signal is inserted to have 21 dB-39 dB less than a broadcasting service signal power of an ATSC type digital broadcasting.

As described above, if the identification signal is used, although the interference signal exists, a wanted signal can be detected. But, if a system is configured as described above, the identification signal must be detected and analyzed. Thus, to detect and analyze the identification signal, it is necessary for a lot of calculation quantity and high complexity. Moreover, a separation and an attenuation phenomenon of an extracted channel profile must be compensated.

Furthermore, it is indispensable that a service provider for implementing a system recognizes correctly an intensity of a signal received from repeaters and an intensity of a signal received from a main transmitter at a specific place. Because it is possible to adjust a power or add the repeaters or the main transmitter if the signal intensity from the transmitter is recognized when determining an additional installation of the system or the increase/decrease of the power. Accordingly, it is necessary to correctly measure the intensity of the signal received from the transmitter.

DISCLOSURE OF INVENTION

Technical Problem

An embodiment of the present invention is directed to providing an apparatus and a method for measuring a receiving intensity of a signal transmitted from each of transmitters in a wireless communication system.

Another embodiment of the present invention is directed to providing an apparatus and a method for measuring a receiving intensity of a signal transmitted from a wireless communication system which identifies transmitters using an identification signal.

Another embodiment of the present invention is directed to providing an apparatus and a method for identifying each of transmitters in a wireless communication system which identifies transmitters using an identification signal, and measuring an intensity of a signal from each of the identified transmitters.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided an apparatus for measuring a receiving power of each of transmitters in a wireless communication system using an identification signal and receiving a signal from at least two transmitters, which includes a total receiving power measuring unit for measuring a total receiving power from transmitters; an identification signal analyzing unit for extracting a channel profile signal from the signal transmitted from the predetermined transmitter through a multi-path, wherein the predetermined transmitter transmits a signal having the identification signal; and an individual receiving power calculating unit for calculating an individual receiving power from the transmitter based on the measured total receiving power and the extracted channel profile signal.

In accordance with another aspect of the present invention, there is provided a method for measuring a receiving power of each of transmitters in a wireless communication system using an identification signal and receiving a signal from at least two transmitters, which includes measuring a total receiving power from transmitters; extracting a channel profile signal from the signal transmitted from the predetermined transmitter through a multi-path, wherein the predetermined transmitter transmits a signal having the identification signal; and calculating an individual receiving power from the transmitter based on the measured total receiving power and the extracted channel profile signal.

Advantageous Effects

If an apparatus for measuring a receiving power in accordance with an embodiment of the present invention measures correctly a receiving power from each of repeaters or a transmitter. Thus, the number of repeaters or transmitters which are installed unnecessarily can be reduced, and a transmission power can be accurately adjusted by measuring a variation of the receiving power according to a time.

MODE FOR THE INVENTION

The advantages, features and aspects of the invention will become apparent from the following description of the embodiments with reference to the accompanying drawings, which is set forth hereafter. Moreover, it is noted that same elements in the accompanying drawings use the same reference number although the same elements appear in different drawings. Furthermore, it will be omitted to describe obvious elements in detail for those skilled in the art.

Firstly, an apparatus and a method for identifying transmitters using an identification signal mentioned in a conventional technique are disclosed in Korean Patent Applications which are entitled by "an apparatus and a method for analyzing an identification signal using a partial correlation scheme (Application Number: 10-2006-0106526)" and "an apparatus and a method for analyzing an identification signal to compensate the isolation and attenuation of a channel profile (Application Number: 10-2007-0090534)".

In general, to design a broadcasting network with a transmitter or repeaters, which are an identical channel repeater or a distributed repeater, various conditions must be considered. That is, an interference problem which is produced by using a single frequency between a transmitter and each of repeaters, or between repeaters must be solved. Thus, it is necessary to identify transmitters using the identification signal mentioned above. In case of a broadcasting network, it is necessary to measure a receiving power from each of transmitters or repeaters. A channel profile for the broadcasting network may be acquired through an identification signal analyzer which is proposed by the patents mentioned above.

However, the receiving power from each of transmitters or repeaters must be measured when a transmitter or a repeater to be measured is turned on, and the other transmitters or repeaters are turned off. It is impossible to perform a method for measuring a receiving power mentioned above when the transmitter and the repeater transmit and repeat the broadcasting, respectively. Moreover, it needs much time and cost to measure a receiving power at night when the transmitter and the repeater do not transmit and repeat.

Accordingly, as shown below, in the present invention, while whole transmitters or repeaters are operated, an apparatus and a method for calculating a receiving power from each of transmitters or repeaters will be described. Moreover, except for a case of identifying the main transmitter and the repeaters, it is assumed that a transmitter includes a main transmitter or one or all of repeaters.

Figure 1:
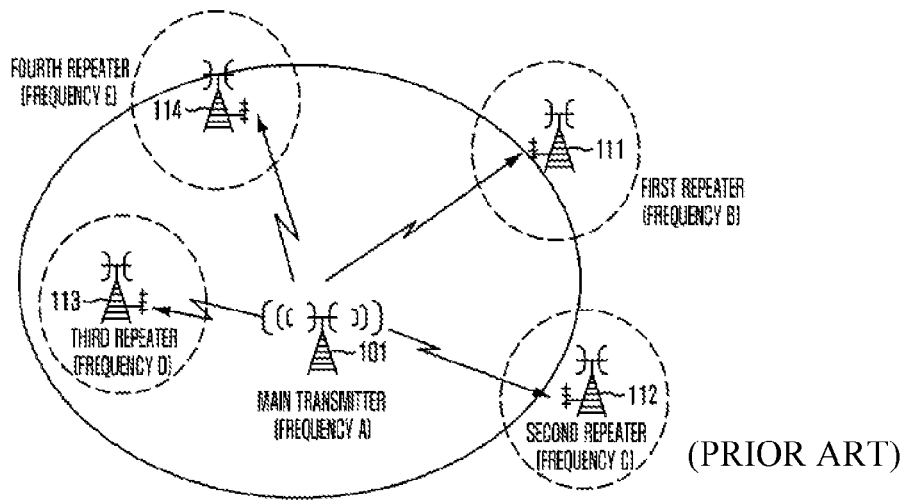
FIG. 1 is a simplified diagram illustrating a method for transmitting data between a main transmitter and a repeater using a different frequency.
Figure 2:
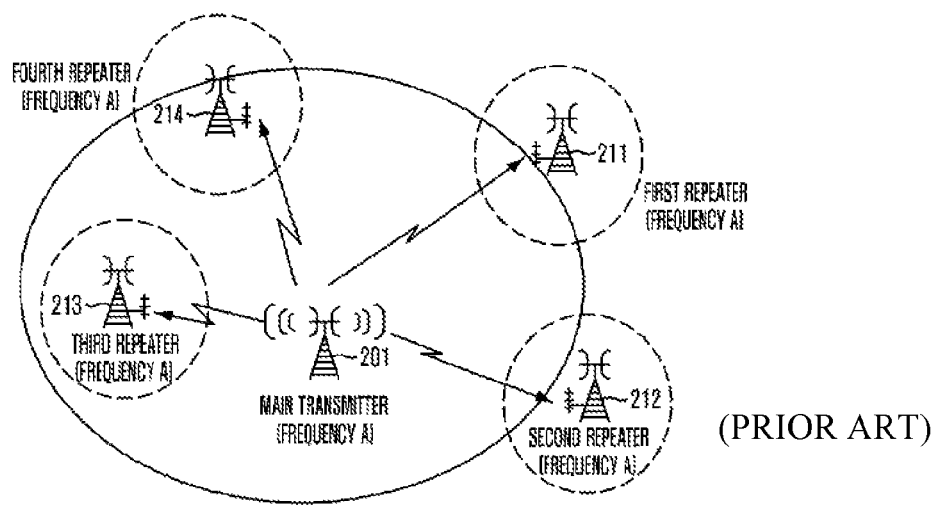
FIG. 2 is a simplified diagram illustrating a method for transmitting data between a main transmitter and repeaters using the same frequency.
Figure 3:
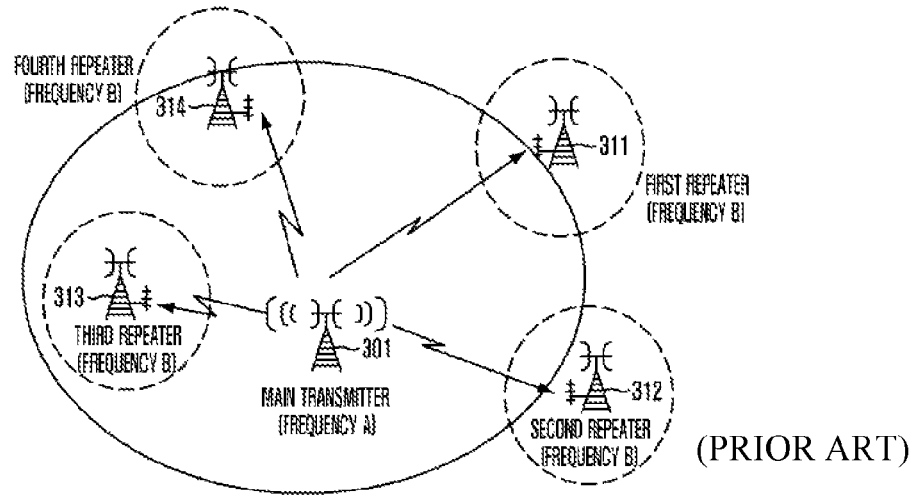
FIG. 3 is a simplified diagram illustrating a method for transmitting data by configuring a distributed repeater network using a distributed repeater.
Figure 4:
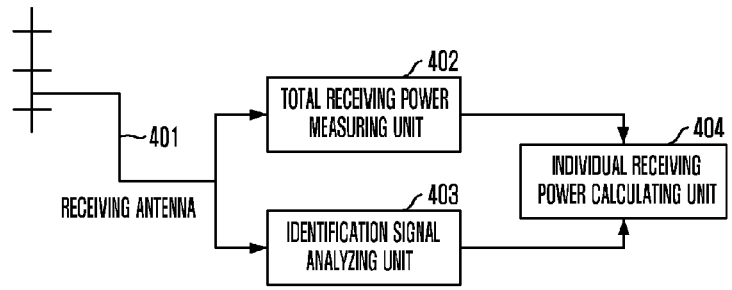
FIG. 4 is a block diagram illustrating an apparatus for calculating a receiving power of each of transmitters using an identification signal in accordance with an embodiment of the present invention.

FIG. 4 is a block diagram illustrating an apparatus for calculating a receiving power of each of transmitters using an identification signal in accordance with an embodiment of the present invention.

Firstly, as mentioned above, it is noted that a wireless communication system for identifying a plurality of transmitters using an identification signal is assumed. Thus, each of transmitters transmits or repeats a signal using an identification allocated to each of the transmitters. An apparatus for calculating a receiving power in accordance with the present invention calculates a total receiving power transmitted from each of the transmitters at a predetermined position. And then, the apparatus measures a power of each of the transmitters from the total power.

A configuration and an operation in accordance with the present invention are described as below with reference to the accompanying drawings.

As mentioned above, each of the transmitters or repeaters inserts an allocated identification signal into broadcasting signal and transmits or repeats data through the RF signal having the identification signal. The apparatus for calculating a power in accordance with the present invention receives the RF signal transmitted from each of transmitter or repeaters through a receiving antenna 401, and provides the received RF signal to a total receiving power measuring unit 402 and an identification signal analyzing unit 403. The total receiving power measuring unit 402 measures a total receiving power of the RF signal received from each of the transmitters and repeaters, and outputs the measured value.

Moreover, the identification signal analyzing unit 403 identifies and outputs whether the RF signal received from each of the transmitters and the repeaters is transmitted from which transmitter based on the identification signal included in the received RF signal. The identification signal analyzing unit 403 identifies transmitters or repeaters for the receiving signal classified by a path based on a multi-path characteristic, extracts a channel profile, and outputs an extracted result. An output signal of the total receiving power measuring unit 402 and the identification signal analyzing unit 403 are input to an individual receiving power calculating unit 404. The individual receiving power calculating unit 404 calculates an individual receiving power based on the total receiving power measured by the total receiving power measuring unit 402 and information for the transmitter and repeaters identified by the identification signal analyzing unit 403.

An operation of the individual receiving power calculating unit 404 for calculating the individual receiving power which is received from the transmitters or repeaters using the identification signal will be described in detail as below.

The total receiving power measured by the total receiving power measuring unit 402 is received from the transmitters or repeaters through the receiving antenna 401 and is a power of the RF signals into which the identification signal is inserted. The total receiving power measuring unit 402 may measure the total receiving power PRX. Moreover, the identification of the RF signal received through the receiving antenna 401 may be analyzed based on the identification signal included in a channel profile for all multi-path signals which are produced by a transmission path.

An individual receiving power of each of transmitters or repeaters may be calculated based on this information as described in the equation 1.

MathFigure 1

$$P_{RX,i\text{-}th\ TX} \simeq \frac{\sum_{l_i=0}^{L_i-1} c_{l_i}^2}{\sum_{i=0}^{T-1} \left\{ \sum_{l_i=0}^{L_i-1} c_{l_i}^2 \right\}} \cdot P_{RX} \qquad [\text{Math. 1}]$$

where $P_{RX,i\text{-}thTx}$ denotes a receiving power received from $i_{th}$ transmitter or repeater, $\tau$ denotes the number of transmitters or repeaters, $L_i$ denotes the number of multi-path signals produced by the ith transmitter or repeater, and $c_{l_i}$ denotes an amplitude of the $l_i$ multi-path signal produced by the $i_{th}$ transmitter or repeater.

Accordingly, the equation 1 calculates a power value from the ith transmitter or repeater. That is, a power of a corresponding transmitter or repeater is acquired by dividing the total receiving power value of the multi-path signal received from the ith transmitter or repeater by a sum of the receiving power of the multi-path signals received from each of the transmitters and repeaters, and multiplying a total receiving power value.

For the convenience of description, a simple example will be introduced as below.

It is assumed that a total receiving power measured by the total receiving power measuring unit 402 is 1 ($P_{RX}$=1), the number of transmitters is two (T=2), a channel profile of the first transmitter which is extracted by the identification signal analyzing unit 403 is {1,0.4}, and a channel profile of the second transmitter is {0.8,0.6,0.3}.

The receiving power of the first and second transmitters can calculated based on the equation 1 as described in the equation 2.

MathFigure 2

$$P_{RX,1stTX} \simeq \frac{1^2 + 0.4^2}{1^2 + 0.4^2 + 0.8^2 + 0.6^2 + 0.3^2} \cdot 1 \simeq 0.516$$

$$P_{RX,2ndTX} \simeq \frac{0.8^2 + 0.6^2 + 0.3^2}{1^2 + 0.4^2 + 0.8^2 + 0.6^2 + 0.3^2} \cdot 1 \simeq 0.484$$

[Math. 2]

As mentioned above, in the present invention, an indispensable configuration is described for an operation of the present invention. However, a separate external device can control an operation of the apparatus in accordance with the present invention. That is, a system using the apparatus in accordance with the present invention can be implemented to perform an operation in response to an operator request through a laptop computer or a specific device connected to the apparatus in accordance with the present invention. The specific device may be controlled to operate in response to a control of an operator through an operator interface.

A case that an operator uses an apparatus in accordance with these verified embodiments of the present invention, which is coupled to a laptop computer, will be described as below. The operator of a system using the apparatus selects one of transmitters of which a receiving power is measured, generates an identification signal of the selected transmitter, and measures the receiving power of the selected transmitter. In this case, a present value of the receiving power transmitted from the transmitter may be measured by selecting the transmitter to be measured. Accordingly, if a different transmitter is selected, a present receiving power of a different transmitter may be measured.

In another embodiment, an apparatus in accordance with the present invention may automatically detect neighbored transmitters sequentially and may measure a receiving power of the detected transmitter. In this case, the apparatus in accordance with the present invention has a memory for storing all identification signals. A receiving power of transmitters may be individually detected based on the stored identification signals and an identification which is used in a transmitter. In this case, because the receiving power may be varied at each of the transmitters at a time slot, a variation amount of the receiving power may be detected at a time slot.

That is, a receiving power of each of transmitters is measured and stored at a specific time slot, and a variation amount of the receiving power may be detected according to the specific time slot by displaying and informing the measured receiving power to an operator. Because although a transmission power of the transmitter or repeater is same with each other, the receiving power may be changed by a circumferential environment variation. As mentioned above, a system designer or a system operator may control a transmission power of the each of repeaters or transmitters at a time slot by detecting the variation of the receiving power at the time slot. That is, an installation of the repeater or transmitter may be prevented by properly adjusting the transmission power at time slot. It is noted that various embodiments of the present invention may be implemented using an accumulated value at a time slot.

As mentioned above, the identification signal analyzing unit 403 performs an important operation so that the individual receiving power calculating unit 404 calculates a receiving power based on a multi-path of the transmitter and repeaters. That is, it must be clearly identified whether a signal transmitted through a multi-path of the transmitter or each of repeaters is received from which transmitter based on whole received signals. Accordingly, a configuration of the identification signal analyzing unit 403 in accordance with the present invention will be described as below.

Figure 5:
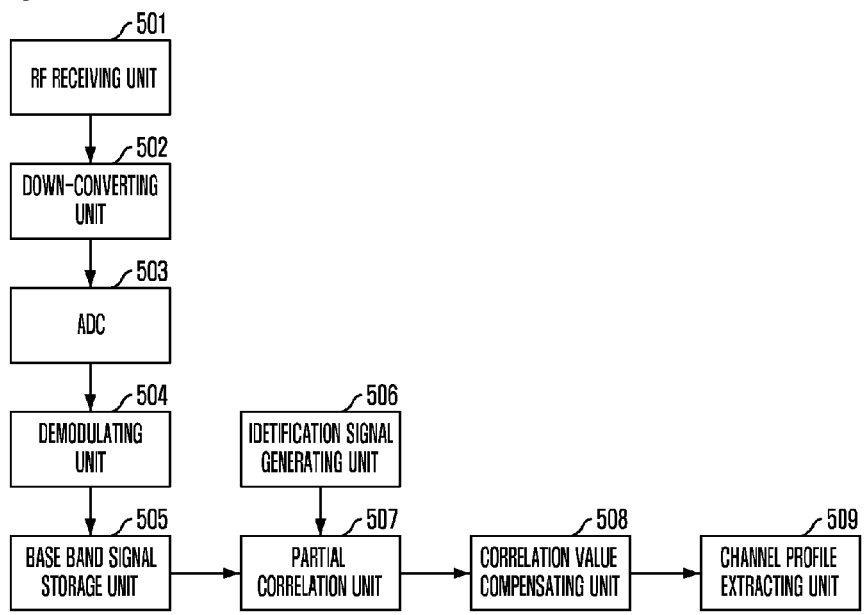
FIG. 5 is a block diagram illustrating an identification signal analyzing unit in accordance with an embodiment of the present invention.

FIG. 5 is a block diagram illustrating a configuration from an RF receiving unit to an identification signal analyzing unit in accordance with an embodiment of the present invention. Hereinafter, referring to FIG. 5, a treatment process of an RF signal and a configuration and an operation of an identification signal analyzing unit will be described.

A signal received from a receiving antenna 401 is input to an RF receiving unit 501. The RF receiving unit 501 may include a band pass filter and an amplifier. The RF receiving unit 501 filters and amplifies a receiving band signal of a receiver to a wanted signal level. If the receiving band signal of the receiver is filtered, a down-converting unit 502 converts a filtered signal into a signal of a predetermined band. The down-converting unit 502 uses one of a direct conversion scheme and a super heterodyne scheme for the down-conversion.

Here, the signal of the predetermined band is an analog type base band signal. Thus, analog-to-digital converting (ADC) unit 503 converts the base band signal into a digital signal. If a using system is an analog system, the ADC unit 503 is unnecessary. A demodulating unit 504 demodulates the digital signal outputted from the ADC 503 and converts the demodulated signal as the requested information of the base band. The demodulated signal is stored in a base band signal storage unit 505. The base band signal storage unit 505 as a sort of a memory stores the demodulated information, and reads necessary information from a corresponding processor. Hereafter, the RF receiving unit 501, the down-converting unit 502, the ADC 503, the demodulating unit 504 and the base band signal storage unit 505 are totally called as "a receiving unit".

An identification signal generating unit 506 generates and outputs an identification signal of a transmitter or repeaters. The identification signal generating unit 506 may be configured to generate all identification signals or may be configured to receive signal information through another control device (not shown in FIG. 5) and generate a requested identification signal. That is, in case of generating the requested identification signal through a control device, a receiving power of a transmitter or repeaters requested by an operator may be measured.

A partial correlation unit 507 reads a received signal from the signals stored in the base band signal storage unit, and calculates a partial correlation value based on the identification signal received from the identification signal generating unit 506. The partial correlation unit 507 uses various schemes for the partial correlation value calculation. It is noted that one example of the schemes for the partial correlation value calculation will be described in FIG. 9. The partial correlation value calculated in the partial correlation unit 507 compensates an isolation and attenuation value by extracting and using a 90°-inverted value.

The correlation value compensating unit 508 outputs the compensated value, which is outputted from the partial correlation unit 507, to a channel profile extracting unit 509. The channel profile extracting unit 509 extracts a channel profile of a multi-path signal, which is produced by a transmission path between the repeater and the signal analyzing unit or between the transmitter and the signal analyzing unit, from the compensated value.

As described above, the demodulating unit 504, the base band signal storage unit 505, the identification signal generating unit 506, the partial correlation unit 507 and the correlation value compensating unit 508 are variously implemented according to a standard of a system. Accordingly, because it is difficult to describe the configuration of all sorts of systems, a block structure and operation of the configuration according to an ATSC DTV standard will be described as below.

Figure 6:
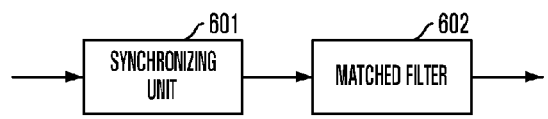
FIG. 6 is a block diagram illustrating a configuration of the demodulating unit shown in FIG. 5 according to an ATSC DTV standard.

FIG. 6 is a block diagram illustrating a configuration of the demodulating unit shown in FIG. 5 according to an ATSC DTV standard.

The digital signal which is converted by the ADC 503 is inputted to a synchronizing unit 601. The synchronizing unit 601 removes and outputs a frequency and a timing offset from the digital signal which is converted by the ADC 503. An output signal of the synchronizing unit 601 is inputted to a matched filter 602. The matched filter 602 generates and outputs a base band signal having an optimized Signal to Noise Ratio (SNR) from the output signal of the synchronizing unit 601.

Figure 7:
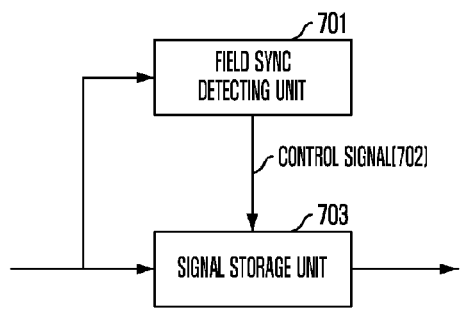
FIG. 7 is a block diagram illustrating a configuration of the base band signal storage unit shown in FIG. 5 according to an ATSC DTV standard.

FIG. 7 is a block diagram illustrating a configuration of the base band signal storage unit shown FIG. 5 according to an ATSC DTV standard.

The base band signal having the optimized SNR which is outputted from the matched filter unit shown in FIG. 6 is inputted to the base band signal storage unit 505. The signal storage unit 505 includes a field sync detecting unit 701 and a signal storage unit 703 FIG. 7.

The base band signal having the optimized SNR is divided into two divided signals. One divided signal is inputted to the field sync detecting unit 701 and the other divided signal is inputted to the signal storage unit 702. The field sync detecting unit 701 detects a field sync signal, generates a control signal in response to the detected field sync signal, and provides the control signal to the signal storage unit 703. The control signal outputted from the field sync detecting unit 701 determines a storage range of a received signal in response to a detection of the field sync signal.

That is, if the field sync detecting unit 701 detects the field sync signal, the field sync detecting unit 701 generates and outputs a control signal for controlling a data signal to be stored. If the field sync detecting unit 701 does not detect the field sync signal, the field sync detecting unit 701 generates and outputs a control signal for controlling a data signal and a field sync signal to be stored. Accordingly, the signal storage unit 703 stores all or a part of the output signal of the demodulating unit 504 in response to the control signal of the field sync detecting unit 701.

Figure 8:
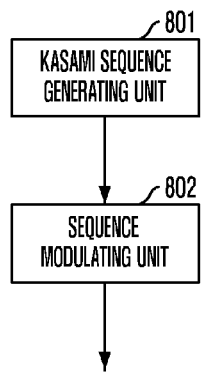
FIG. 8 is a block diagram illustrating a configuration of the identification signal generating unit shown in FIG. 5 according to an ATSC DTV standard.

FIG. 8 is a block diagram illustrating a configuration of the identification signal generating unit shown in FIG. 5 according to an ATSC DTV standard.

A Kasami sequence generating unit 801 generates and outputs a Kasami sequence. In the ATSC DTV standard, the Kasami sequence having a length of 65535 is generated. Moreover, as mentioned above, the Kasami sequence generating unit 801 generates a requested identification signal to detect a receiving signal of a transmitter or a repeater of which a power of a receiving signal is measured. In another embodiment in accordance with the present invention, the Kasami sequence generating unit may acquire the information of the requested identification signal and generate the Kasami sequence corresponding to the acquired information through a control device which is not shown in FIG. 8.

Moreover, the Kasami sequence generated from the Kasami sequence generating unit 801 is inputted to a sequence modulating unit 802. The sequence modulating unit performs a modulation based on a predetermined process. In the ATSC DTV standard, the modulation of a Binary Phase Shift Keying (BPSK) process is performed. But, it is noted that a different modulation process may be performed in a different system.

Figure 9:
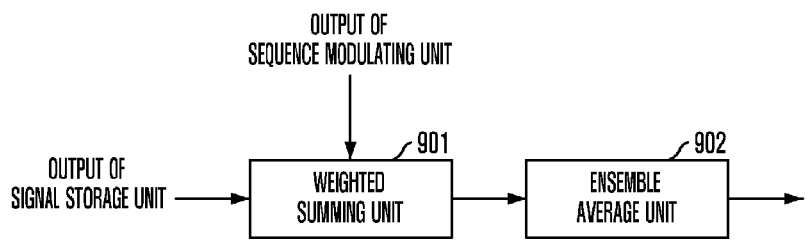
FIG. 9 is a block diagram illustrating a configuration of the partial correlation unit shown in FIG. 5 according to an ATSC DTV standard.

FIG. 9 is a block diagram illustrating a configuration of the partial correlation unit shown in FIG. 5 according to an ATSC DTV standard.

A weighted summing unit 901 reads requested information from the information stored in the base band signal storage unit 505 and calculates a partial correlation value based on the requested information and an output signal generated by the identification signal generating unit 506.

The calculated partial correlation value is inputted to an ensemble average unit 902. The ensemble average unit 902 accumulates the output of the weighted summing unit 901, and calculates and outputs an accumulated average value. The weighted summing unit 901 and the ensemble average unit 902 will be described as below in reference with FIG. 10.

Figure 10:
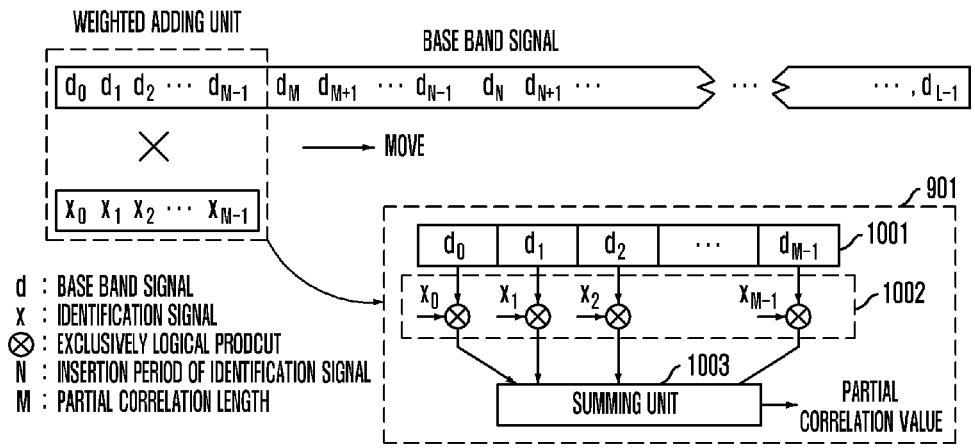
FIG. 10 is a concept diagram illustrating an operation of a weighted summing unit shown in FIG. 9.

FIG. 10 is a concept diagram illustrating an operation of a weighted summing unit shown in FIG. 9.

It is assumed that a length of the identification signal generated by the identification signal generating unit 506 is N. Here, the length N denotes a length of an inserted identification signal in a transmitter or a repeater. And the identification signal is expressed as $$x_0, x_1, \ldots, x_{N-1}.$$

If a requested length of the generated identification signal is M, the identification signal is acquired as much as M. Here, M must be equal to or smaller than N. Thus, the identification signal having the requested length is expressed as $$x_0, x_1, \ldots, x_{M-1}.$$

That is, the correlation value is calculated based on the signal information read from the signal storage unit 505 and the identification signal having the requested length. If it is assumed that the length of the signal stored in the signal storage unit 505 is L, the stored base band signal is expressed as $$d_0, d_1, \ldots, d_{M-1}, d_M, d_{M+1}, \ldots, d_{N-1}, d_N, d_{N+1}, \ldots, d_{L-1}.$$

And, then, the weighted summing unit 901 performs a multiplication operation of the base band signal and the identification signal having the requested length. That is, referring to FIG. 10, the base band signal is sequentially inputted to a shift register 1001 and is shifted. A multiplication unit 1002 performs a multiplication operation for the requested signals of the Kasami signal. Output values of the multiplication unit 1002 are summed in an summing unit 1003. The summing unit outputs a partial correlation value. The operation mentioned above may be expressed as equation 3.

MathFigure 3

$$V_i = \frac{1}{M} \sum_{j=0}^{M-1} d_{i+j} x_j, \ 0 \le i < L - M \quad \text{[Math. 3]}$$

As mentioned above, an average value of the correlation value is calculated in the ensemble average unit 902. If an indicated average value is K, the average value which is calculated based on the equation 3 by the ensemble average unit 902 is expressed as equation 4.

MathFigure 4

$$C_l = \frac{1}{K} \sum_{k=0}^{K-1} v_{KN+1}, \ 0 \le l < N \quad \text{[Math. 4]}$$

Figure 11:
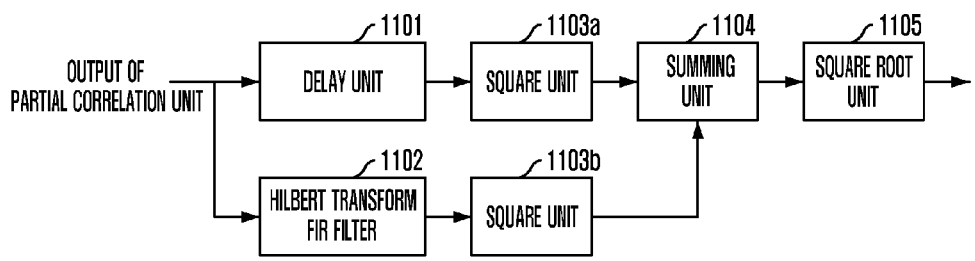
FIG. 11 is a block diagram illustrating a configuration of the correlation value compensating unit shown in FIG. 5 according to an ATSC DTV standard.

FIG. 11 is a block diagram illustrating a configuration of the correlation value compensating unit shown in FIG. 5 according to an ATSC DTV standard.

An output of the partial correlation unit 507 is inputted to a correlation value compensating unit and is divided into two divided signals. One divided signal is inputted to a Hilbert transform Finite Impulse Response (FIR) filter 1102. The other divided signal is inputted to a delay unit 1101. Firstly, the Hilbert transform FIR filter unit 1102 receives an output signal of the partial correlation unit 507 and outputs a 90°-inverted signal. The 90°-inverted signal of the Hilbert transform FIR filter unit may be expressed as equation 5.

MathFigure 5

$$\hat{C}_l = \frac{1}{\pi} \int_{-\infty}^{\infty} \frac{c_m}{1-m} dm, \ 0 \le l < N \quad \text{[Math. 5]}$$

The delay unit 1101 delays and outputs the output signal of the partial correlation unit 507 as much as a processing time in the Hilbert transform FIR filter unit 1102, that is, as much as a time corresponding to the number of tabs of an FIR filter. A square operation of the output of the delay unit 1101 and the Hilbert transform FIR filter unit 1102 is respectively performed in square units 1103a and 1103b, and the output values of the square units 1103a and 1103b are inputted to an summing unit 1104. The summing unit 1104 sums and outputs the output values of the square units 1103a and 1103b.

A square root operation for an output value of the summing unit 1104 is performed in a square root unit 1105. A correlation value is compensated by the operation of the summing unit 1104 and the square root unit 1105. If a delay time of the delay unit 1101 is D, the output signal of the square root unit 1105 is expressed as equation 6.

MathFigure 6

$$Z_l = \sqrt{C_{l-D}^2 + C_l^2}, \ 0 \le l < N \quad \text{[Math. 6]}$$

As mentioned above, the present invention calculates a receiving power from each of transmitters based on an identification signal. That is, the present invention may be applied to any environment where a calculation of a receiving power is requested in a broadcasting system and an RF communication system for transmitting an RF signal using an identification signal.

The present application contains subject matter related to Korean Patent Application No. 2008-0105343, filed in the Korean Intellectual Property Office on Oct. 27, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

The invention claimed is:

1. An apparatus for measuring a receiving power of each of a plurality of transmitters in a wireless communication system, comprising:
    a total receiving power measuring unit for measuring a total receiving power from the plurality of transmitters;
    an identification signal analyzing unit for extracting a channel profile signal from a signal having multi-path characteristics transmitted from one of the plurality of transmitters through multiple paths, wherein the signal includes an identification signal, and wherein the identification signal analyzing unit includes
        a receiving unit for receiving and converting radio frequency signals into a signal of a requested band, converting the signal of the requested band into a digital signal, and demodulating and storing the digital signal, wherein the identification signal allocated to each of the plurality of transmitters is inserted into the radio frequency signals,
        an identification signal generating unit for generating an identification signal identical to the identification signal allocated to each of the plurality of transmitters,
        a partial correlation unit for calculating a correlation value between the stored digital signal and the generated identification signal through a partial correlation scheme,
        a correlation value compensating unit for compensating an isolation and an attenuation of the multi-path signal using a 90°-inverted value for the correlation value calculated by the partial correlation unit, and
        a channel profile extracting unit for extracting the channel profile signal of the multi-path signal of each of the plurality of transmitters from a value resulting from the compensation, and
    an individual receiving power calculating unit for calculating an individual receiving power from the one of the plurality of transmitters based on the measured total receiving power and the extracted channel profile signal.

2. The apparatus of claim 1, wherein the receiving unit includes:
    a radio frequency receiving unit for extracting and receiving a radio frequency signal transmitted from each of the plurality of transmitters,
    a down-converting unit for converting an output of the radio frequency receiving unit into the signal of a requested band,
    an analog-digital converting unit for converting the signal of a requested band into the digital signal, a demodulating unit for demodulating the digital signal, and
    a baseband signal storage unit for storing the demodulated digital signal.

3. The apparatus of claim 2, further comprising:
    a control unit for controlling measurement of an individual receiving power of each of the plurality of transmitters by a predetermined time unit; and a memory for storing the individual receiving power of each of the plurality of transmitters measured at a time slot.

4. The apparatus of claim 1, further comprising:

a control unit for controlling measurement of an individual receiving power of each of the plurality of transmitters by a predetermined time unit; and a memory for storing the individual receiving power of each of the plurality of transmitters measured at a time slot.

5. A method for measuring a receiving power of each of a plurality of transmitters in a wireless communication system, comprising:

measuring a total receiving power from the plurality of transmitters;

extracting a channel profile signal from a signal having multi-path characteristics transmitted from one of the plurality of transmitters through multiple paths, wherein the signal includes an identification signal, and wherein the extracting includes receiving and converting radio frequency signals into a signal of a requested band, converting the signal of the requested band into a digital signal, and demodulating and storing the digital signal, wherein the identification signal allocated to each of the plurality of transmitters is inserted into the radio frequency signals, generating an identification signal identical to the identification signal allocated to each of the plurality of transmitters, calculating a correlation value between the stored digital signal and the generated identification signal through a partial correlation scheme, compensating an isolation and an attenuation of the multi-path signal using a 90°-inverted value for the correlation value, and extracting the channel profile signal of the multi-path signal of each of the plurality of transmitters from a value resulting from the compensating, and calculating an individual receiving power from the one of the plurality of transmitters based on the measured total receiving power and the extracted channel profile signal.

6. The method of claim 5, further comprising controlling measurement of an individual receiving power of each of the plurality of transmitters by a predetermined time unit; and storing the individual receiving power of each of the plurality of transmitters measured at a time slot.

* * * * *